United States Patent [19]

Hill

[11] Patent Number: 5,112,367
[45] Date of Patent: May 12, 1992

[54] FLUID FRACTIONATOR

[76] Inventor: Charles C. Hill, 2518 Via Merano, Del Mar, Calif. 92014

[21] Appl. No.: 660,177

[22] Filed: Feb. 25, 1991

Related U.S. Application Data

[63] Continuation of Ser. No. 438,786, Nov. 20, 1989, abandoned.

[51] Int. Cl.⁵ .......................................... B01D 53/04
[52] U.S. Cl. ........................................... 55/26; 55/62; 55/68; 55/74; 55/75; 55/179; 55/387; 55/389
[58] Field of Search .................. 55/25, 26, 58, 62, 68, 55/74, 75, 161–163, 179, 180, 387, 389

[56] References Cited

U.S. PATENT DOCUMENTS

| | | | |
|---|---|---|---|
| 2,759,560 | 8/1956 | Miller | 55/180 X |
| 2,955,673 | 10/1960 | Kennedy et al. | 55/33 |
| 3,069,830 | 12/1962 | Skarstrom et al. | 55/179 X |
| 3,104,162 | 9/1963 | Skarstrom | 55/58 |
| 3,138,439 | 6/1964 | Skarstrom | 55/33 |
| 3,182,435 | 5/1965 | Axt | 55/62 X |
| 3,242,650 | 3/1966 | Crawford | 55/62 X |
| 3,323,292 | 6/1967 | Brown | 55/179 X |
| 3,464,186 | 9/1969 | Hankison et al. | 55/163 |
| 3,472,000 | 10/1969 | Glass et al. | 55/163 |
| 3,487,608 | 1/1970 | Gräff | 55/179 X |
| 3,572,008 | 3/1971 | Hankison et al. | 55/62 X |
| 3,880,616 | 4/1975 | Myers et al. | 55/62 |
| 4,038,054 | 7/1977 | Gräff | 55/179 |
| 4,168,149 | 9/1979 | Armond et al. | 55/179 X |
| 4,209,308 | 6/1980 | Blodgett | 55/179 |
| 4,272,265 | 6/1981 | Snyder | 55/179 X |
| 4,378,982 | 4/1983 | McCombs | 55/179 X |
| 4,428,372 | 1/1984 | Beysel et al. | 55/179 X |
| 4,469,494 | 9/1984 | van Weenen | 55/179 |
| 4,496,376 | 1/1985 | Hradek | 55/179 X |
| 4,648,888 | 3/1987 | Rowland | 55/25 X |
| 4,713,094 | 12/1987 | Yanagawa et al. | 55/163 |
| 4,787,417 | 11/1988 | Windsor, Jr. | 55/179 X |
| 4,826,510 | 5/1989 | McCombs | 55/179 |
| 4,877,429 | 10/1989 | Hunter | 55/179 X |
| 4,892,569 | 1/1990 | Kojima | 55/163 |
| 4,925,464 | 5/1990 | Rabenau et al. | 55/179 |

FOREIGN PATENT DOCUMENTS

| | | | |
|---|---|---|---|
| 737929 | 7/1943 | Fed. Rep. of Germany | 55/179 |
| 54-136575 | 10/1979 | Japan | 55/179 |
| 63-077516 | 4/1988 | Japan | 55/179 |
| 784150 | 10/1957 | United Kingdom | 55/179 |

OTHER PUBLICATIONS

Nemmers, *Compressed Air*, pp. 11–14 (Sep. 1959).
Breck et al., *Chem. Engrg. Prog.*, pp. 43–53 (Oct. 1977).
Lukchis, "Adsorption Systems", Linde Bulletin F-4164; reprinted from *Chem. Engrg.* (Jun. 11; Jul. 9 and Aug. 6, 1973).

*Primary Examiner*—Robert Spitzer
*Attorney, Agent, or Firm*—Brown, Martin, Haller & McClain

[57] ABSTRACT

An improved apparatus for fractionating fluid mixtures by pressure swing molecular adsorption employing a rotary distributor valve and an array of adsorber columns. The columns are contained within a product holding tank. The valve sequences to provide a quasi steady-state flow, allowing optimization of adsorption/desorption cycles, and eliminating most of the valves, switches and plumbing usually required.

13 Claims, 4 Drawing Sheets

FLUID FRACTIONATOR

This is a continuation of application Ser. No. 07/438,786 filed Nov. 20, 1989, now abandoned.

BACKGROUND OF THE INVENTION

1. Field of the Invention

This invention relates to an improved apparatus and method for purifying a fluid product by removing certain components of a fluid mixture or contaminants from a source of a single fluid. Since this invention is effective in separation of gases and liquids, depending on circumstances, the term fluid will be used as much as possible. It is understood that the term includes gases and liquids. Although focus is directed to the medical use as a respiratory support in the present embodiment, this invention is also useful in other situations where zeolites and sieve materials are employed, for example oil refinery procedures.

2. Description of the Related Art

The use of selectively adsorbent molecular sieve materials having uniform pore sizes in separation of fluid components has been in practice since about 1948, with the first industrial research efforts occurring at Union Carbide Corporation. Based on the first experimental observations of the adsorption of gases on naturally occurring zeolites and the behavior of the latter as molecular sieves by Barrer in 1945 (J. Soc. Chem. Ind., 64:130), Milton and coworkers at Union Carbide synthesized the first industrial zeolite molecular sieves in 1948 (R. M. Milton, Molecular Sieves, Soc. Chem. Ind., London, 1968, p. 199), and they were test marketed in 1954.

Most separations of fluid mixtures by adsorption require regeneration of the adsorbent after saturation with the adsorbate. Since most separations are performed on fixed-bed columns, complex mechanisms involving intricate networks of interconnected and interoperating valves and switches have been devised to implement adsorption and desorption cycles in order to facilitate regeneration.

Costly and elaborate equipment like that described above is suitable for large scale commercial operations where the equipment is constantly monitored by competent technicians. However, in dealing with the problem of supplying relatively small quantities of oxygen to patients, especially at home, size, ease of operation and, even more importantly, reliability are the primary concerns.

The use of synthetic molecular sieves in a two-bed, pressure swing adsorber for separation of oxygen from air for medical and industrial applications became commercially practical in the early 1970's and many manufacturers now build such equipment.

The components in a typical two column system currently available are:
Air compressor
Heat exchanger
Air receiver or surge tank
Two molecular sieve chambers
Two pressure dropping orifices
Product tank (oxygen receiver)
Four or five two-way solenoid operated directional flow control valves (or, alternatively, one 4-way valve and one 2-way valve)
Electrical or electronic sequencing timer control for the valves
Pressure reducing regulator for oxygen product flow
Intake and exhaust silencers
Intake and product filters
Adjustable flow control valve for oxygen product flow
Connecting tubing and fittings to conduct fluid flows into and out of components The above list of components clearly indicates the complexity of a typical medical oxygen concentrator (or respiratory support system), requiring a network of interconnected parts acting in concert. This complexity can give rise to the prospect of decreased reliability, and the chance that some component will malfunction, or a connection leak will develop, rendering the entire apparatus incapable of performing its life-support function.

The compressor discharge profile in a two column system, when plotted against time manifests a "sawtooth" pattern which is responsible for shortening compressor valve and bearing life, requiring an air receiver or surge tank to limit such fluctuation. This cyclic flow in the two column adsorber also produces large pressure variations in product gas flow, requiring the use of a pressure reducing regulator in the dispensing conduit. The abrupt, large pressure changes also require extensive silencing.

Furthermore, to provide an ambulatory patient with acceptable mobility and quality of life, a supplementary oxygen supply system must be reliable, economical, compact, portable and light in weight. The instant invention provides a system which addresses all these parameters.

SUMMARY OF THE INVENTION

This invention encompasses an improved apparatus for fractionating a fluid mixture by pressure swing molecular adsorption. This apparatus contains a plurality of adsorber columns and a chamber functioning as a purified product holding tank.

The heart of the apparatus is a unique, rotary distributor valve assembly for sequentially pressurizing and exhausting each column. This allows pressurization of one of the columns while simultaneously purging the adsorbent medium in another of such columns.

This invention further encompasses an improved process for removing fluid components by selective adsorption of particular fluids from a stream of a mixture of fluids or a contaminating fluid component from a stream of a single fluid.

An incoming stream of a pressurized fluid mixture is sequentially distributed by means of a rotating member of the rotary distributor valve into a plurality of columns packed with an adsorbent which is selective for the fluid or the contaminant fluids to be removed. The contaminants are retained by the adsorbent and the desired product fluid is allowed to pass through. By simultaneously refluxing product fluid under low pressure, through columns other than columns being pressurized, the contaminant is desorbed and exits the system.

The ability to manipulate the adsorption/desorption profile by selecting the relative size of pressurizing and exhaust channels in the rotor shoe of the distributor valve is a unique feature not found in existing oxygen concentrator systems.

A novel, smaller, smoother in operation, simpler and more reliable apparatus for providing supplementary oxygen to patients is presented below as an exemplary embodiment of the instant invention. An improved method of fractionating fluid mixtures, which arises out of judicious use of the described apparatus is also presented.

DESCRIPTION OF THE PREFERRED EMBODIMENT

Figure 1:
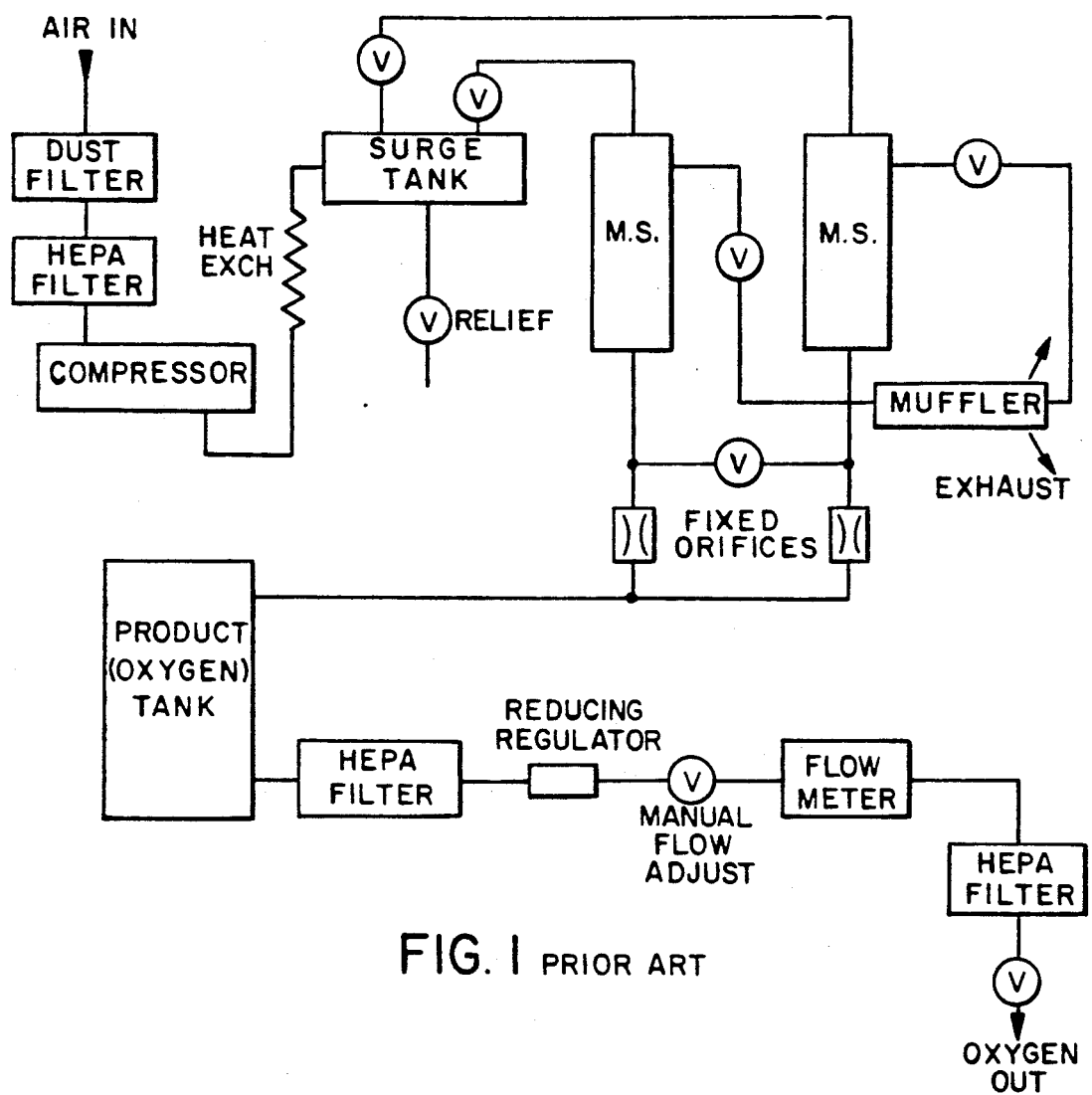
FIG. 1 depicts schematically a typical two-column adsorbent fractionating prior art system commercially available.
Figure 2:
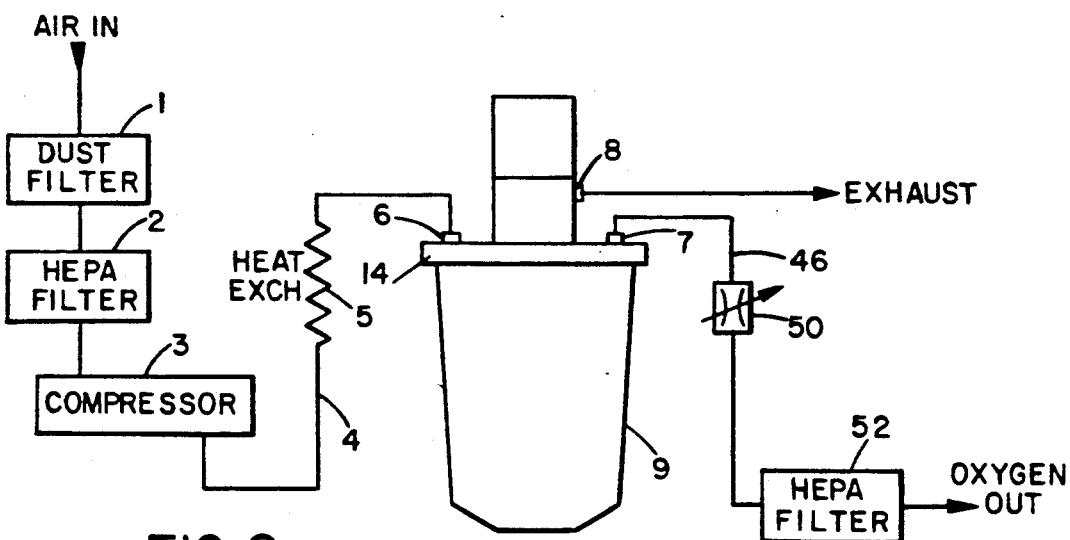
FIG. 2 is a schematic representation of the entire fluid fractionator respiratory support system of the instant invention.

FIG. 1 depicts schematically a typical small two-column oxygen concentrator commercially available for patient use. It can readily be seen from the schematic diagram that a typical medical oxygen concentrator is a complex machine, with a multitude of interconnected and interacting parts Attendant with this manifold complexity is the prospect of decreased reliability, or the increased chance that some component will fail, rendering the entire apparatus incapable of performing its life-supporting function The apparatus of this invention, with its unique design which requires far fewer parts, will be described by following a volume of mixed fluids (air in this case) as it moves through the fractionation procedure. In FIG. 2, ambient air is drawn in through a pair of filters, one dust 1 and one high efficiency particle arrestor (HEPA) 2 connected in series, by a compressor 3. The air is compressed and forced within a conduit 4 into a heat exchanger 5. The heat exchanger removes most of the heat of compression before the air is fed into the inlet port 6 of the fluid fractionator. The cooling air in the exchanger is provided by a fan mounted on the compressor shaft, thereby, obviating the requirement of an additional motor and energy source. After most of the nitrogen is removed by the adsorber columns of the fractionator, an oxygen-rich fraction is tapped off through an outlet port 7 to the dispensing conduit, while the desorbed nitrogen is purged by the balance of the oxygen-rich product flow and leaves through an exhaust port 8.

Figure 3:
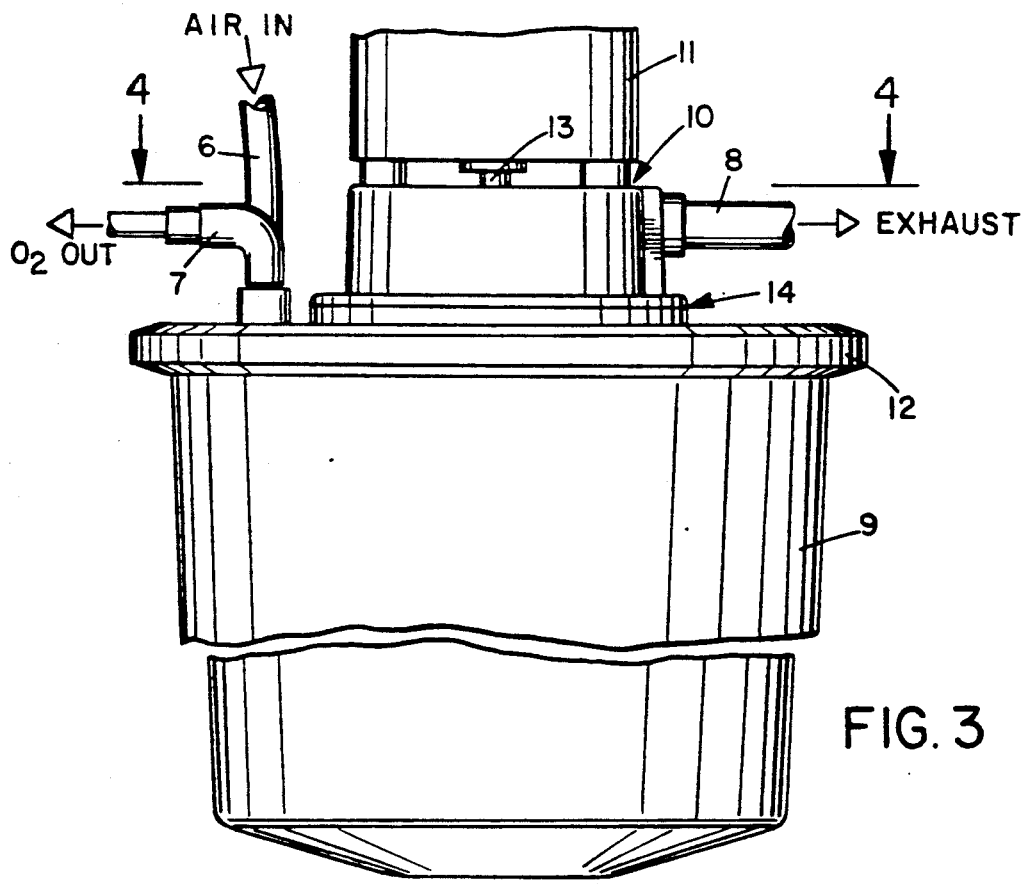
FIG. 3 is a side elevation view of the apparatus which is the subject of this invention

The fluid fractionator, in FIG. 3, comprises a product holding tank 9 containing a cluster or array of adsorber columns within its housing, a rotary valve distributor 10 and a gear motor 11.

Figure 4:
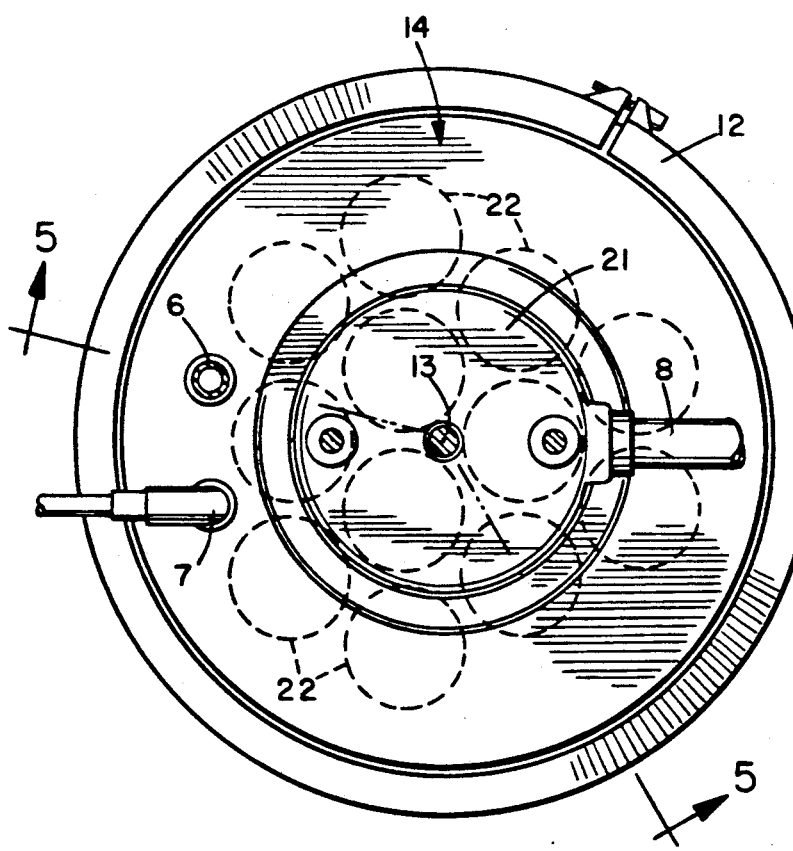
FIG. 4 is a view taken on line 4—4 of FIG. 3.

FIG. 4, a view taken on line 4—4 of FIG. 3, shows the arrangement of an array of columns 22 within the holding tank relative to the inlet 6, outlet 7 and exhaust 8 ports of the rotary distributor valve assembly, which is affixed to the holding tank by means of a clamp band 12. Twelve columns are shown in this case but there could be any number of two or more.

Figure 5:
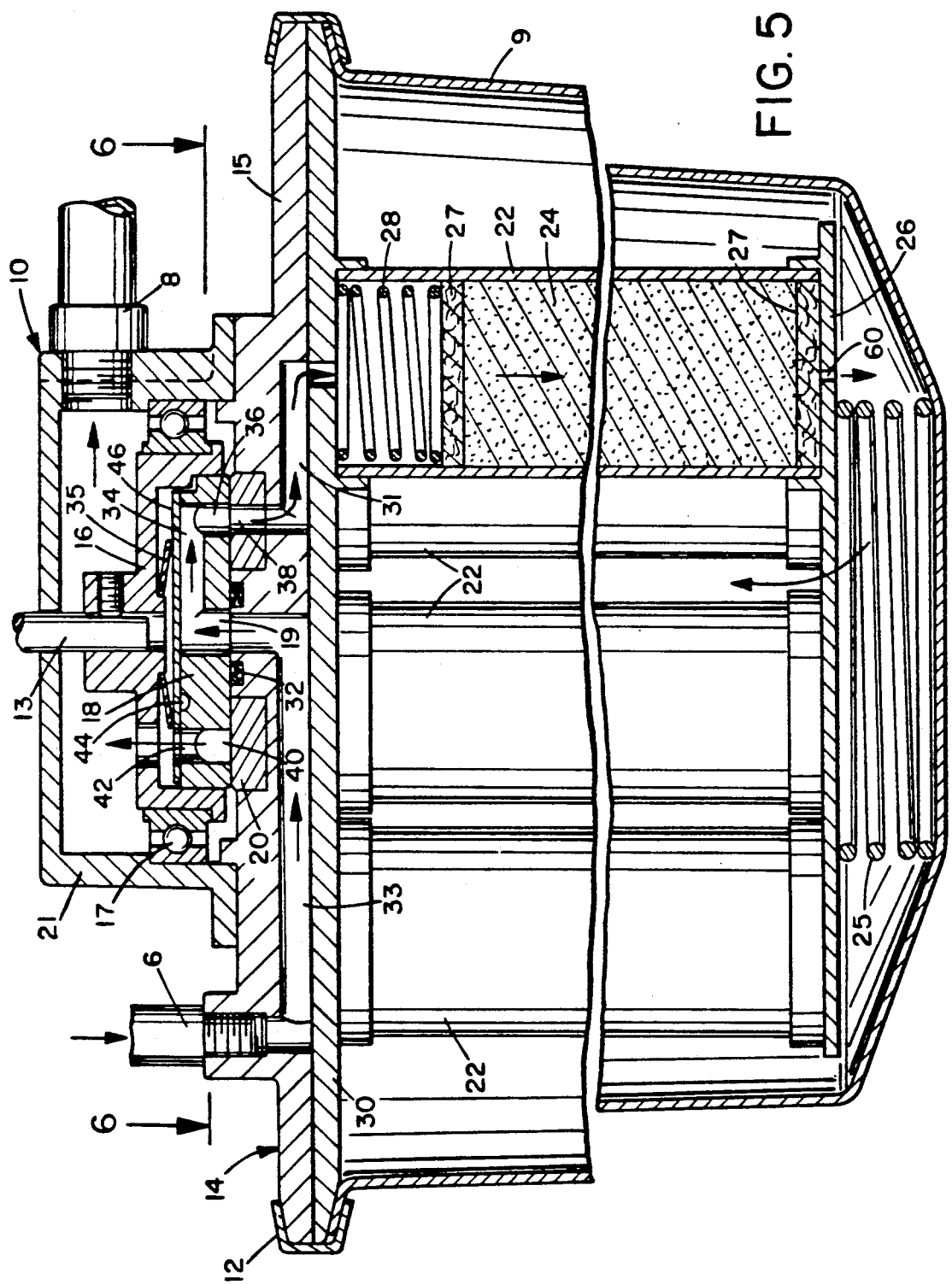
FIG. 5 is an enlarged sectional view taken on line 5—5 of FIG. 4.

The rotary distributor valve depicted in FIG. 5, which is an enlarged sectional view taken on line 5—5 of FIG. 4, comprises a ported and channeled two-piece manifold 14 and a rotor 16 with a ported rotor shoe 18 and a cover plate 46, the rotor 16 being driven by a gear motor 11 (FIG. 3) at about two revolutions per minute with the rotor 16 turning in circumferential ball bearing unit 17. Conical disk or Belleville spring 35 urges cover plate 46 and rotor shoe 18 downward to secure them in position. The rotor 16 and its associated components are enclosed by cover 21, which is attached to manifold 14.

Following the arrows indicating fluid flow direction, the two-piece manifold 14 contains a top section 15 which is ported and channeled to take in a stream of fluid through the inlet port 6 and channel it through an air feed passage 33 into a centrally located inlet port 19 in the rotor shoe 18, and subsequently to channel the fluid mixture exiting the rotor shoe radially from a circular array of inlet ports located in the port plate 20 towards each column 22 of an array of columns arranged about the center of the manifold. Each of these columns contains a bed of adsorbent material 24 (zeolite in this case) which is selective for a particular molecular species of fluid or contaminant. The packed bed is held in place by a plate 26 at the bottom and perforated plates 27 at top and bottom with a spring 28 at the top. The bottom plate has a pressure-dropping means such as a small orifice 60, the diameter of which is empirically determined, at the center of each column.

The bottom half of the manifold, which is also an upper column header plate 30, affixed to the top half of the manifold by means of a clamp band 12, acts as a cover for the channels and has the array of columns attached to its underside. The channels in the manifold are sealed by a gasket or sealing compound.

Recessed into the top of the manifold, coaxial to the exit port of the air feed channel 33, sealed and immobilized by means of a slot and key, is the port plate 20 which contains a number of holes in an equally spaced circular pattern, equal in number and aligned with the circular distribution of entry ports of channels to individual columns in the manifold. The manifold has a groove machined into its upper surface, just inside the port plate, which contains an air inlet rotary seal 32. The port plate is made from ceramic or hardened stainless steel.

The other major component of the rotary distributor valve is a gear motor-driven rotor 16 containing a ported rotor shoe 18, which slides over the rotor plate (FIG. 5, 6, 7, and 8 all depict various aspects of the rotor/shoe). The rotor shoe is made from graphite or material with equal properties, and is held in position over the rotor plate by spring-loaded or pressure compensated means. Shown is a conical or Belleville pressure compensating spring to counteract supply pressure. An arrangement of small coil springs can also be utilized for this purpose.

Figure 6:
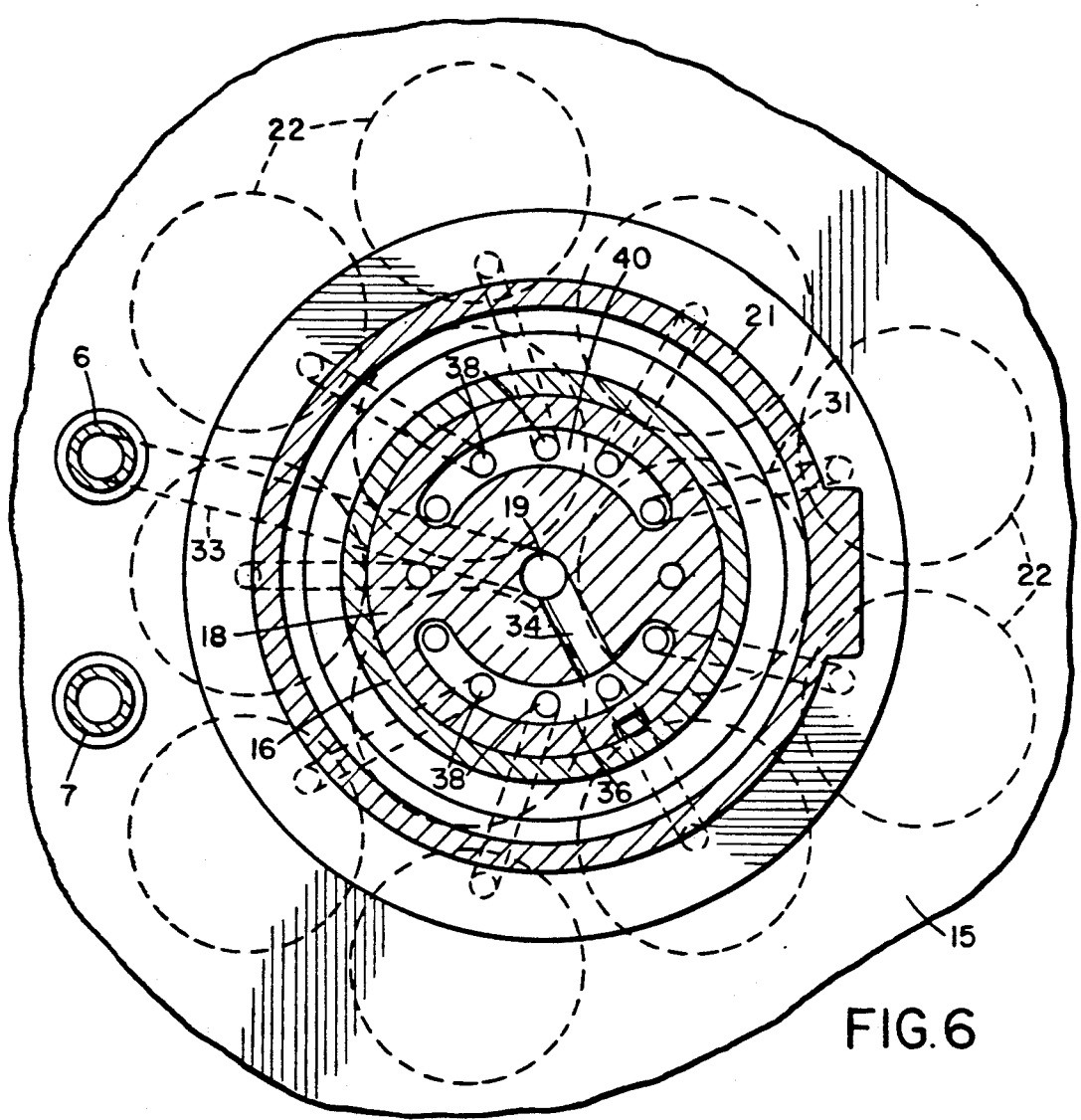
FIG. 6 is a sectional view taken on line 6—6 of FIG. 5.

In the rotor shoe, there are three channels. One channel is a pressurizing channel or air feed passage 34 originating at the central fluid inlet port 19, and radiating into an arcuate slot 36 to simultaneously serve as a conduit into I several of the circularly positioned ports in the port plate. As the rotor shoe turns, each new port appearing in the slot is pressurized, and the port at the other end of the slot passes out of the slot and is depressurized Full system pressure is maintained at all intermediate ports. FIG. 6, a sectional view taken on line 6—6 of FIG. 5, shows the relationship of the arcuate air feed port or slot 36 of the rotor shoe 18 and the receiving ports 38 in the port plate, as well as the air feed channels 31 to each of the columns 22.

Figure 7:
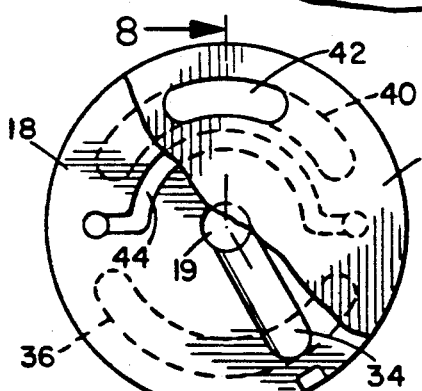
FIG. 7 is a top plan view, partially cut away, of the rotor shoe.

In another channel, the wide exhaust port 40 collects refluxed fluid impurities desorbing and exiting from the columns, and channels them out through an exhaust outlet 8 (FIG. 5), through a "silencer" and into the atmosphere FIG. 7 is a top plan view, partially cut away, of the rotor shoe. Several other features come into view here. The desorbed columns are vented upward through the exhaust slot 40, through a vent 42 in the rotor shoe cover plate 46, into the rotor void space, and out through the exhaust port 8 (FIG. 5).

The third channel is a cross-port channel 44 which serves as a conduit between two columns which are in transition between the pressurizing and desorbing phases of a cycle. Its purpose is to quickly equalize pressure in columns transitioning between the adsorbing and desorbing cycles. This feature enhances product concentration at high product flow rates.

Figure 8:
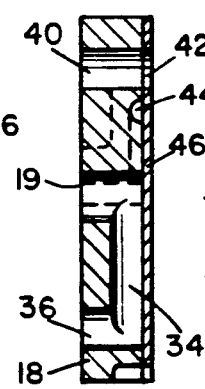
FIG. 8 is a sectional view taken on line 8—8 of FIG. 7.

The purge flow rate is the rate at which the purging fluid flows countercurrent to adsorption during regeneration of the columns. There is an optimal purge rate for maximal removal of nitrogen during regeneration. A very high purge rate causes the pressure within a bed to be greater than atmospheric, resulting in reduced desorption efficiency. The cross-porting channel in the rotor shoe allows a pressure drop in the column bed before it enters the desorption cycle. This prevents a very rapid decompression and thus excessively high initial purge flow. This effect is easily measurable by simple instrumentation; however, its basis at the molecular level is not understood FIG. 8 is a sectional view taken on line 8—8 of FIG. 7, showing the routing of the pressurizing 34, cross-porting 44 and exhausting 40 channels in the rotor shoe 18.

Figure 9:
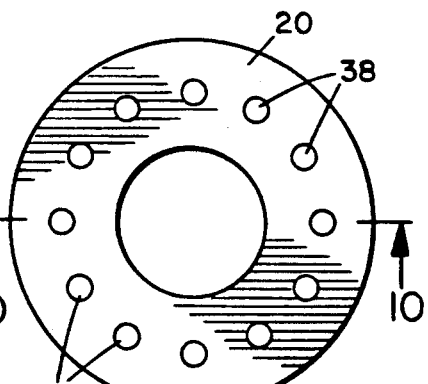
FIG. 9 is a top plan view of the port plate.
Figure 10:
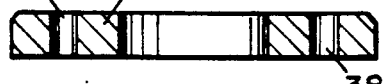
FIG. 10 is a sectional view taken on line 10—10 of FIG. 9.

FIG. 9 is a top plan view of the port plate showing the circular location of ports of channels leading to each of the array of columns, and FIG. 10 is a sectional view taken on line 10—10 of FIG. 9.

The preferred method of fractionating air to provide an oxygen-rich air supply to a patient is described below.

Fractionation Method

At this point it is reiterated that although air fractionation is described, the method is effective in fractionating other fluids.

With reference again to FIG. 6, compressed air enters the inlet port 6 of the manifold and is channeled through the air passage in the manifold 33 communicating with the rotor shoe 18 and then into the arcuate pressurizing slot 36 to enter sequentially into several ports 38 in the port plate as the rotor shoe 18 turns. As these ports become pressurized, the gas mixture enters, pressurizes and flows through each attached column 22 where the separation takes place.

Referring now to FIG. 5, the desired gas, oxygen in this case, is free to move through the zeolite adsorbent bed 24 (e.g. Linde 5A), while the undesired gases and vapor (nitrogen plus $CO_2$, CO, $H_2O$) are retained, because of their molecular size and the relatively high pressure and low temperature, in the matrix of the adsorbent bed.

The purified desired gas product (oxygen) moves out of the column through a pressure-dropping means such as a small orifice 60 or a fluid porous plug, or other means known to those skilled in the art, in the bottom of the column and into the circumscribed product tank 9. From the product tank, a relatively small portion of the oxygen is tapped off by the distribution system conduit at the outlet port 7 (FIG. 6) for use by the patient, and another, relatively large, portion enters the columns in the opposite bank, which are under nearly atmospheric pressure, through a corresponding the small pressure dropping/flow restricting orifices in the bottom to reflux through the bed in a direction opposite to gas flow during pressurization. The amount of product used to purge versus the amount delivered by the distribution system can vary, depending on the degree of product purity desired. This backwash of product gas at pressure lower than the adsorbing cycle removes the contaminant embedded in the zeolite matrix, in this case nitrogen, and flushes it out through the top of each column into the manifold 14, the port plate 20 and through the rotor shoe 18 and exhaust outlet 8 into the atmosphere via a silencer or muffler.

Referring back to FIG. 2, the tapped oxygen-rich product gas then moves within a dispensing conduit 46 through a manually controlled valve 50 with a flow meter, through a final filter (HEPA) 52 and to the dispensing terminus.

When the motor is operated at 2 revolutions per minute, and the arcuate pressure and exhaust slots in the rotor shoe are equal in size, the cycle profile is such that each column is pressurized for approximately 12.5 seconds, equilibrated for 2.5 seconds, and desorbed for 12.5 seconds and re-equilibrated. This profile of the cycle is obtainable only when the arcuate intake and exhaust slots in the rotor shoe are equal in size, and service an equal number of columns The profile can be altered as desired by varying the size of the respective arcuate slots. This is a desirable feature which cannot be put into effect in any of the prior art mechanisms.

As the rotor rotates over the port plate, this cycle is sequentially and continuously established for each column. This mode of operation produces a relatively constant flow of product, improving with a greater number of columns, eliminating the need for a pressure reducing regulator.

The product outlet pressure is nearly constant and about twice as high as that provided in the prior art. The pressure difference across the adsorber column chamber walls, because of their location in the pressurized product tank, is about one half of that found in a typical prior art apparatus. This feature allows column walls of lighter construction.

Some other advantages of the present invention are outlined hereunder. Because of the large number of small adsorber columns, the column length may be short, even with a large length:diameter ratio which is essential for effective adsorption separation. The large number of columns and the rotary distributor valve result in a quasi steady-state gas flow through the compressor and other components which produces a number of advantages and system simplifications.

The invention permits optimization of the adsorption cycle by providing the possibility of employing unequal times for the adsorption and desorption phases of the cycle. Prior art two chamber systems are inherently bound to equal times.

Another notable advantage of the invention is the elimination of many components which are necessary in the prior art, thereby, reducing size, weight and the amount of maintenance, concomitantly increasing reliability and maneuverability for the ambulatory patient. These eliminated components include:

Air receiver or surge tank

Four or five solenoid valves (or a 4-way valve and one 2-way solenoid valve)

Electric or electronic sequencing control for the solenoid valves

Pressure reducing regulator

Almost all connecting tubing and fittings

The elimination of almost all "plumbing" decreases size and weight, the potential for system leaks and reduces manufacturing costs.

Although the adsorbent material utilized in this embodiment is a synthetic zeolite, there are many other useful adsorbents available; therefore, this invention should not be construed as restricted to its use. It is understood by those well versed in the art that many other configurations are possible while employing the rotary distributor concept, which are within the spirit and scope of this invention.

I claim,

1. An improved process for removing a fluid component of a particular fluid from a stream of a mixture of fluids or a contaminating component from a stream of a single fluid through pressure swing adsorption having a pressurizing phase and a desorbing phase comprising the steps of:
   a. admitting a pressurized fluid mixture into a rotary valve distributor;
   b. said rotary valve distributor comprising:
      i. a fluid manifold for receiving said fluid mixture and purging said contaminating component;
      ii. an immobile port plate having a first and second plurality of openings in fluid communication with a first and second plurality of columns; said port plate further having an integral inlet channel for a substantially continuous flow of fluid; and
      iii. rotatable distributor means in fluid communication with said manifold, said means comprising a rotor and rotor shoe having an arcuate distribution port which sequentially pressurizes said first plurality of columns as said rotor shoe rotates said distribution port over said first plurality of openings in said port plate; and arcuate exhaust port which sequentially and simultaneously exhausts fluid carrying the contaminating component and emanating from each of said second plurality of columns as said rotor rotates said exhaust port over said second plurality of openings in said port plate; a cross-porting channel with two ports, each situated between the two arcuate ports, for connecting two columns, which are in transition between the pressurizing and desorbing phases, allowing rapid pressure equalization; said rotor shoe further having an integral exhaust channel for a substantially continuous exhaust of fluid carrying the contaminating component; and
   c. sequentially distributing said compressed fluid mixture, by means of a rotating member of said rotary valve distributor, into one or more of said first plurality of columns packed with an adsorbent material selective for the fluid or contaminant to be removed, where said fluid or contaminant is retained and desired product fluid is allowed to pass through; and
   d. simultaneously refluxing, under low pressure, a portion of product fluid through one or more of said second plurality of columns, each fluid entering through an orifice at one end of each said column and exiting through the opposite end and into the atmosphere; and
   e. simultaneously withdrawing purified product fluid as required.

2. An improved process for removing a fluid component of a particular fluid from a stream of a mixture of fluids or a contaminating component from a stream of a single fluid as recited in claim 1 wherein said adsorbent in step c is a zeolite.

3. An improved process for removing a fluid component of a particular fluid from a stream of a mixture of fluids or a contaminating component from a stream of a single fluid as recited in claim 1 wherein each of said pluralities of columns contains two or more columns.

4. An apparatus for fractionating a fluid mixture by pressure swing molecular adsorption having a pressurizing phase and a desorbing phase which comprises:
   a. a first and second plurality of adsorber columns, each containing molecular adsorption medium for fractionation of a mixture of fluids passed thereinto by separation of said mixture into a purified portion which passes through said first and second pluralities of columns and exits therefrom during said pressurizing phase and a retained portion which is retained by said medium during said desorbing phase;
   b. chamber means containing said columns, means for receiving and storing said purified portion and a fluid exit port for removal of a first part of said purified portion from said chamber;
   c. a distributor valve assembly comprising
      i. a fluid manifold for receiving said fluid mixture and purging said retained portion;
      ii. an immobile port plate having a first and second plurality of openings in fluid communication with said columns; said port plate further having an integral inlet channel for a substantially continuous flow of fluid; and
      iii. rotatable distributor means in fluid communication with said manifold, said means comprising a rotor and rotor shoe having an arcuate distribution port which sequentially pressurizes said first plurality of columns as said rotor shoe rotates said distribution port over said first plurality of openings in said port plate; and arcuate exhaust port which sequentially and simultaneously exhausts fluid carrying the retained portion and emanating from each of said second plurality of columns as said rotor rotates said exhaust port over said second plurality of openings in said port plate; a cross-porting channel with two ports, each situated between the two arcuate ports, for connecting two columns, which are in transition between the pressurizing and desorbing phases, allowing rapid pressure equalization; said rotor shoe further having an integral exhaust channel for a substantially continuous exhaust of fluid carrying the retained portion; and 5. An apparatus for fractionating a fluid mixture as described in claim 4, wherein said each of said pluralities of adsorber columns contains two or more columns.

6. An apparatus for fractionating a fluid mixture as described in claim 5, wherein said columns have a high length to diameter ratio.

7. An apparatus for fractionating a fluid mixture as described in claim 6, wherein said columns contain means to reduce reflux pressure.

8. An apparatus for fractionating a fluid mixture as described in claim 4, wherein said means to reduce reflux pressure comprises a small orifice at the end of each column opposite said connection to said distributor valve manifold.

9. An apparatus for fractionating a fluid mixture as described in claim 4, wherein said columns are sealed by a mechanical sealing means at the end opposite to the orifice.

10. An apparatus for fractionating a fluid mixture as described in claim 9, wherein said columns contain spring means to keep the medium compacted.

11. An apparatus for fractionating a fluid mixture as described in claim 4, wherein said fluid mixture is nitrogen and trace amounts of other fluids.

12. An apparatus for fractionating a fluid mixture as described in claim 4, wherein said chamber means is closed at one end and sealed by said distributor valve assembly at the other end.

13. An apparatus for fractionating a fluid mixture as described in claim 4, wherein said chamber has said fluid exit port for removal of said purified portion located in said fluid manifold.

* * * * *

UNITED STATES PATENT AND TRADEMARK OFFICE
CERTIFICATE OF CORRECTION

PATENT NO. :   5,112,367
DATED      :   May 12, 1992
INVENTOR(S):   Charles C. Hill It is certified that error appears in the above-identified patent and that said Letters Patent is hereby corrected as shown below:

Column 7, Claim 1, line 46, "and" should be --an--;

Column 8, Claim 4, line 49, "and" should be --an--;

Column 8, Claim 4, line 62, after ";and" insert --means for rotating said rotatable distributor means.--

Signed and Sealed this

Nineteenth Day of October, 1993

Attest:

BRUCE LEHMAN

Attesting Officer

Commissioner of Patents and Trademarks